(12) United States Patent
Gatuslao

(10) Patent No.: US 8,732,997 B2
(45) Date of Patent: May 27, 2014

(54) AUTOMATED ROTATING BILL BOARD

(76) Inventor: Glenn R. Gatuslao, Makati (PH)

( * ) Notice: Subject to any disclaimer, the term of this patent is extended or adjusted under 35 U.S.C. 154(b) by 0 days.

(21) Appl. No.: 13/448,333

(22) Filed: Apr. 16, 2012

(65) Prior Publication Data

US 2012/0198740 A1 Aug. 9, 2012

Related U.S. Application Data

(63) Continuation of application No. 13/133,645, filed as application No. PCT/PH2009/000012 on Aug. 12, 2009, now Pat. No. 8,156,670.

(30) Foreign Application Priority Data

Dec. 8, 2008 (PH) .............................. 2-2008-00534

(51) Int. Cl.
*G09F 19/00* (2006.01)

(52) U.S. Cl.
USPC .......................................................... 40/473

(58) Field of Classification Search
USPC .......... 40/430, 731, 733, 473, 474; 74/412 R, 74/413, 490.01
See application file for complete search history.

(56) References Cited

U.S. PATENT DOCUMENTS

| | | | |
|---|---|---|---|
| 3,320,691 A | 5/1967 | Harmon | |
| 3,947,985 A | 4/1976 | Skrzypczak | |
| 4,568,070 A * | 2/1986 | Severt | 269/60 |
| 5,625,967 A * | 5/1997 | Kulle | 37/443 |
| 6,571,495 B1 | 6/2003 | Margaronis | |
| 8,156,670 B2 | 4/2012 | Gatuslao | |
| 2002/0152656 A1 | 10/2002 | Huang | |
| 2006/0137231 A1 | 6/2006 | Phillips | |
| 2010/0018098 A1 | 1/2010 | Xu | |

FOREIGN PATENT DOCUMENTS

| | | |
|---|---|---|
| FR | 2842010 A1 | 1/2004 |
| KR | 10-2002-0078163 A | 10/2002 |
| KR | 10-0522970 B1 | 10/2005 |
| KR | 10-2006-0012352 A | 2/2006 |
| WO | WO-2010/068125 A1 | 6/2010 |
| WO | WO-2012/102628 A1 | 8/2012 |

OTHER PUBLICATIONS

International Search Report mailed Mar. 22, 2010, for PCT Application No. PCT/PH2009/000012, filed Aug. 12, 2009, two pages.
International Search Report mailed Oct. 13, 2011, for PCT Application No. PCT/PH2011/000005, filed Apr. 15, 2011, four pages.

* cited by examiner

*Primary Examiner* — Casandra Davis
(74) *Attorney, Agent, or Firm* — Morrison & Foerster LLP

(57) ABSTRACT

This utility model relates in general to Advertising medium but more particularly to an Automated Rotating Billboards structures. The billboard structure comprising a billboard frame having lighting facility consisting of plurality of lighting fixtures secured thereto and being provided with a covering for securing advertisement thereon, the frame being supported by an upstanding post fixedly attached on its bottom portion thereof. The upstanding post comprising of a lower stationary post member and upper rotating post member. The upper post member is being adapted to rotate using an electric motor wherein the billboard is connected. With rotating billboard, it can be seen from all angles thus more efficient and convenient to use.

8 Claims, 2 Drawing Sheets

AUTOMATED ROTATING BILL BOARD

CROSS REFERENCE TO RELATED APPLICATIONS

This application is a continuation of U.S. patent application Ser. No. 13/133,645, filed Jun. 8, 2011, which is a United States National Stage Application under 35 U.S.C. §371 of International Patent Application No. PCT/PH2009/000012, filed Aug. 12, 2009, entitled "Automated Rotating Bill Board," which claims the benefit to Philippines Application No. 2-2008-000534, filed Dec. 8, 2008, entitled "Automated Rotating Billboard," each of which is incorporated by reference in their entirety for all intended purposes.

FIELD OF THE UTILITY MODEL

This utility model relates in general to Advertising medium but more particularly to an Automated Rotating Billboards structures.

BACKGROUND OF THE UTILITY MODEL

Heretofore, existing billboards requires at least 100 square meters of lot area to mount a 40×60 steel frame structure, the problem in this kind of billboards is that it is too expensive to construct and there's a need for a bigger space.

It is therefore the main object of the present utility model to provide a billboard that requires lesser space and can capture a niche in the market that can only be possible when it is strategically located that is, where contemporary outdoor billboards are not or cannot be positioned.

Another problem with the existing billboards is that only two directions are visible to the public for viewing, with the present automated billboard, advertisers are enable to display their ad materials in different angles visible from all directions preferred at a given time. This will attract more advertisers as it offers a unique and wider scope in terms of capturing the attention of prospective clients.

Furthermore the present utility model is light and easy to transport to desired location.

Still another object of the utility model is to provide Automated Rotating Billboards that is easy to manufacture using locally available material and technology These and other object of the present utility model will be apparent upon reading the following description taken in conjunction with the accompanying drawing.

DETAILED DESCRIPTION

Figure 1:
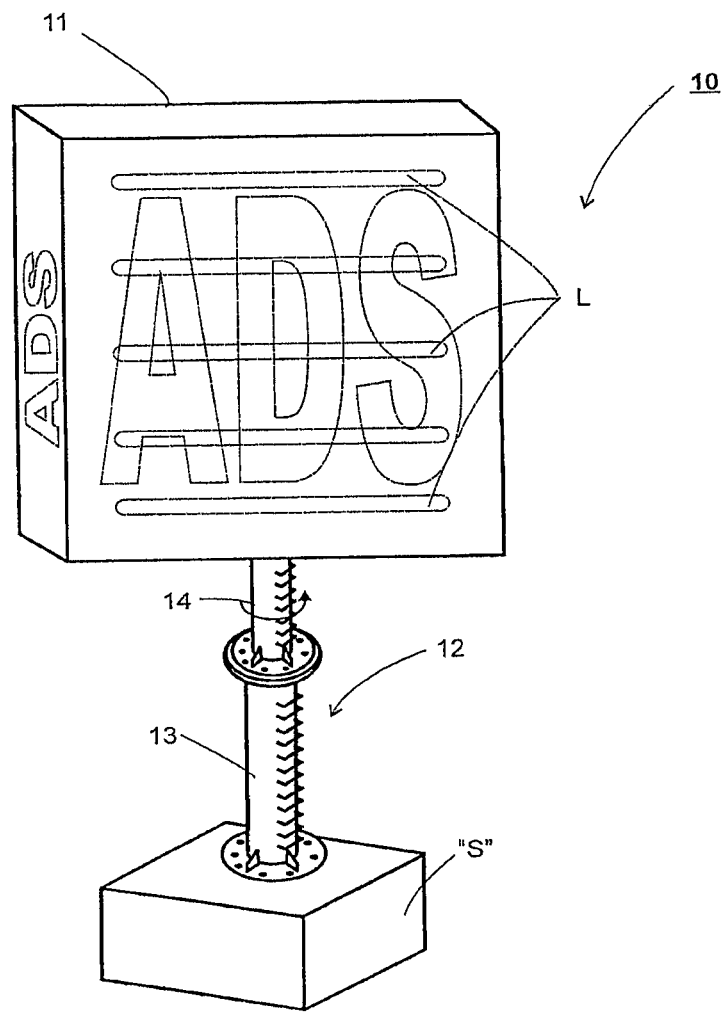
FIG. 1 is a perspective view of an Automated Rotating Billboard with longitudinal rectangular billboard frame.
Figure 2:
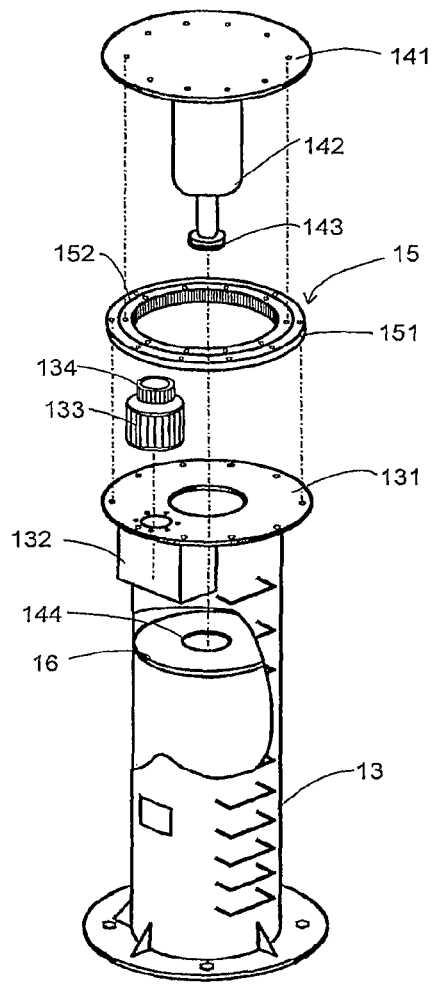
FIG. 2 is a partial exploded perspective view of the moving mechanism thereof.
Figure 3:
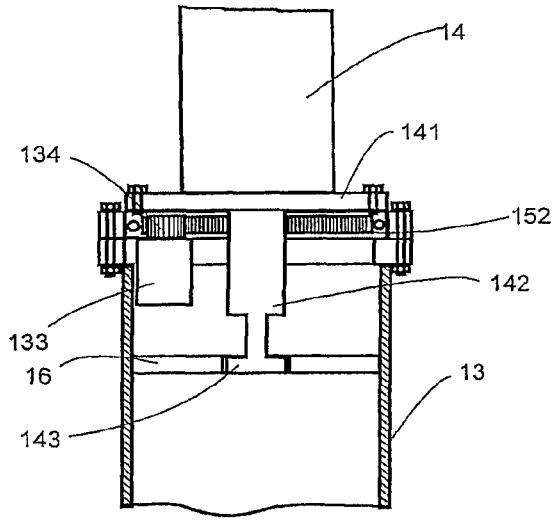
FIG. 3 is a partial sectional view of the interconnection of the upper and lower post members.

Referring now to the several views of the drawings, wherein like reference numerals designate same parts throughout, there is shown a utility model for Automated Rotating Billboard generally designated as 10.

Said automated rotating billboard 10 comprises a billboard frame 11 having lighting facility "L" consisting of plurality of lighting fixtures secured thereto and being provided with a covering for securing advertisement thereon. Said billboard frame 11 preferably made of steel structure frame, the size of the frame vary in height and width. The height is proportionate to its body and base to maintain its sturdiness from top to bottom. Said frame 11 being supported by an upstanding post 12 fixedly attached on its bottom portion thereof. The improvement wherein said upstanding post 12 comprising of a lower stationary post member 13 and upper rotating post member 14. Said lower stationary post member 13 being fixedly connected to the ground preferably to a concrete slab "S" by bolting and being provided on its upper end portion with a connecting plate 131 and provided below said connecting plate 131 is a motor housing 132 wherein an electric motor 133 is being disposed therein. The electric motor 133 having a upwardly extending pinion gear 134 adapted to be meshed to a bearing assembly 15 of said upper rotating post member 14. Said bearing assembly 15 comprising of a circular ring 151 adapted to be fixedly attached to said connecting plate 131 preferably by bolting. The circular ring 151 being provided with an annular gear 152 rotatively in communication to the inner circumference of said circular ring 151. The annular gear 152 being meshed to said pinion gear 134 and adapted to be fixedly attached to an upper connecting plate 141 of said upper rotating post member 14 preferably by bolting. The upper connecting plate 141 being provided on its lower side portion with an extension shaft 142 with a rotating disc 143 on its free end which extends within said lower stationary post member 13 and meshed to a central bore 144 of an auxiliary supporting plate 16 fixedly attached to the inner side portion of the lower cylindrical post. The upper connecting plate 141 is adapted to support the cylindrical upper post member 14.

Said motor rotates said pinion gear and transfer its rotation to said annular gear to which the upper rotating post member wherein the billboard frame 11 is fixedly attached, thus it also rotates.

This structure can withstand typhoon and gusty winds even with the tarpaulin on. The lighting facility secured inside the billboard frame providing bright illumination evenly diffused on both faces of the tarpaulin ad material.

Said bearing assembly is disposed at the end of the external portion of the upper cylinder allowing ease in the rotation and prevent the motor from being over-loaded or over worked. The efficiency of bearing function and the accuracy in the calculation to determine the fulcrum point center where weight is balance from all sides of the moving cylinder should lessen the friction that will allow ease in rotation and save on electricity and prevent motor from being over-worked or over-loaded.

The foregoing description is provided for illustrative purposes only and should not be construed as in any way limiting this utility model, the scope of which is defined solely by the appended claims.

What is claimed:

1. An apparatus comprising:
   a post comprising:
   a first connecting plate;
   a second connecting plate;
   a bearing assembly comprising a circular ring and an annular gear; and
   a lower post member;
   wherein the circular ring is fixedly attached to the second connecting plate;
   wherein the annular gear is fixedly attached to the first connecting plate;
   wherein the annular gear is configured to rotate within the circular ring;

wherein the second connecting plate is fixedly attached to a top end of the lower post member; and wherein the lower post member is fixedly connected to a concrete slab buried in the ground.

2. An apparatus comprising:
a post comprising:a first connecting plate;
a second connecting plate;
a bearing assembly comprising a circular ring and an annular gear;
a lower post member; and
a shaft;
wherein the circular ring is fixedly attached to the second connecting plate;
wherein the annular gear is fixedly attached to the first connecting plate;
wherein the annular gear is configured to rotate within the circular ring;
wherein the second connecting plate is fixedly attached to a top end of the lower post member;
wherein the shaft is fixedly attached to a bottom side of the first connecting plate;
wherein the shaft extends within the lower post member;
wherein the shaft has a disc on its free end;
wherein the disc is engaged with a central bore of an auxiliary supporting plate that is fixedly attached within the lower post member.

3. An apparatus comprising:
a post comprising:
a first connecting plate;
a second connecting plate;
a bearing assembly comprising a circular ring and an annular gear; and
an upper post member;
wherein the circular ring is fixedly attached to the second connecting plate;
wherein the annular gear is fixedly attached to the first connecting plate;
wherein the annular gear is configured to rotate within the circular ring; and
wherein the first connecting plate supports the upper post member.

4. The apparatus of claim 3, wherein the bearing assembly is disposed at a bottom end of the upper post member.

5. The apparatus of claim 3, wherein the upper post member is configured to rotate automatically.

6. The apparatus of claim 3, further comprising a display frame attached to the upper post member.

7. The apparatus of claim 6, wherein the display frame comprises a steel structure.

8. The apparatus of claim 6, wherein the display frame contains one or more lighting fixtures.

* * * * *